(12) United States Patent
Gupta et al.

(10) Patent No.: US 12,700,893 B2
(45) Date of Patent: Aug. 4, 2026

(54) SELF-INTERFERENCE, ECHO AND CROSSTALK MITIGATION IN MULTI-LANE INTERCONNECTS

(71) Applicant: Indian Institute of Technology Bombay, Mumbai (IN)

(72) Inventors: Shalabh Gupta, Mumbai (IN); Ganpat Anant Parulekar, Mumbai (IN); Sandeep Goyal, Delhi (IN)

(73) Assignee: INDIAN INSTITUTE OF TECHNOLOGY BOMBAY (IIT BOMBAY), Mumbai (IN)

( * ) Notice: Subject to any disclaimer, the term of this patent is extended or adjusted under 35 U.S.C. 154(b) by 362 days.

(21) Appl. No.: 18/633,022

(22) Filed: Apr. 11, 2024

(65) Prior Publication Data

US 2024/0348285 A1      Oct. 17, 2024

(30) Foreign Application Priority Data

Apr. 11, 2023      (IN) .............................. 202321026913

(51) Int. Cl.
*H04B 3/32* (2006.01)
*H04B 3/487* (2015.01)
(52) U.S. Cl.
CPC ............... *H04B 3/32* (2013.01); *H04B 3/487* (2015.01)

(58) Field of Classification Search
None
See application file for complete search history.

(56) References Cited

U.S. PATENT DOCUMENTS

| | | | | |
|---|---|---|---|---|
| 12,549,323 B1 * | 2/2026 | Saulnier | ................ | H04L 5/1461 |
| 2015/0146765 A1 * | 5/2015 | Moffatt | .................... | H04B 1/40 |
| | | | | 375/219 |
| 2016/0285486 A1 * | 9/2016 | Qin | ........................... | H04L 5/14 |
| 2020/0295912 A1 * | 9/2020 | Venkatraman | .......... | H04L 5/143 |

* cited by examiner

*Primary Examiner* — Nguyen H Ngo

(57) ABSTRACT

Embodiments disclosed herein provides a method for mitigating an interference signal in a multi-lane interconnect. The method includes transmitting, by a first device (101), a first signal using a MLD (504) to a second device (103) on a first transmission line of the multi-lane interconnect between the first device (101) and the second device (102). The method includes receiving a second signal transmitted from the second device (102) on the first transmission line while simultaneously transmitting the first signal to the second device (102) on the first transmission line. Further, the method includes adjusting the plurality of impedances such that an input impedance (Zin) seen into the first device from the first transmission line matches the characteristic impedance (Z0) of the first transmission line. One or more transconductance cells or driver cells in the RD are tuned for cancellation or suppression of interference signals at a RFE (505) input.

18 Claims, 6 Drawing Sheets

S1 transmitting a first signal using a MLD to a second device on a first transmission line of the multi-lane interconnect between the first device and the second device

S2 receiving a second signal transmitted from the second device on the first transmission line while simultaneously transmitting the first signal to the second device on the first transmission line

S3 adjusting a plurality of impedances such that an input impedance seen into the first device from the first transmission line matches a characteristic impedance of the first transmission line

S4 tuning a RD of the first device to cancel or suppress at least a Self-Interference (SI) at the RFE input of the first device caused by the first signal

S1 transmitting a first signal using a MLD to a second device on a first transmission line of the multi-lane interconnect between the first device and the second device

S2 receiving a second signal transmitted from the second device on the first transmission line while simultaneously transmitting the first signal to the second device on the first transmission line

S3 adjusting a plurality of impedances such that an input impedance seen into the first device from the first transmission line matches a characteristic impedance of the first transmission line

S4 tuning a RD of the first device to cancel or suppress at least a Self-Interference (SI) at the RFE input of the first device caused by the first signal

FIG. 13

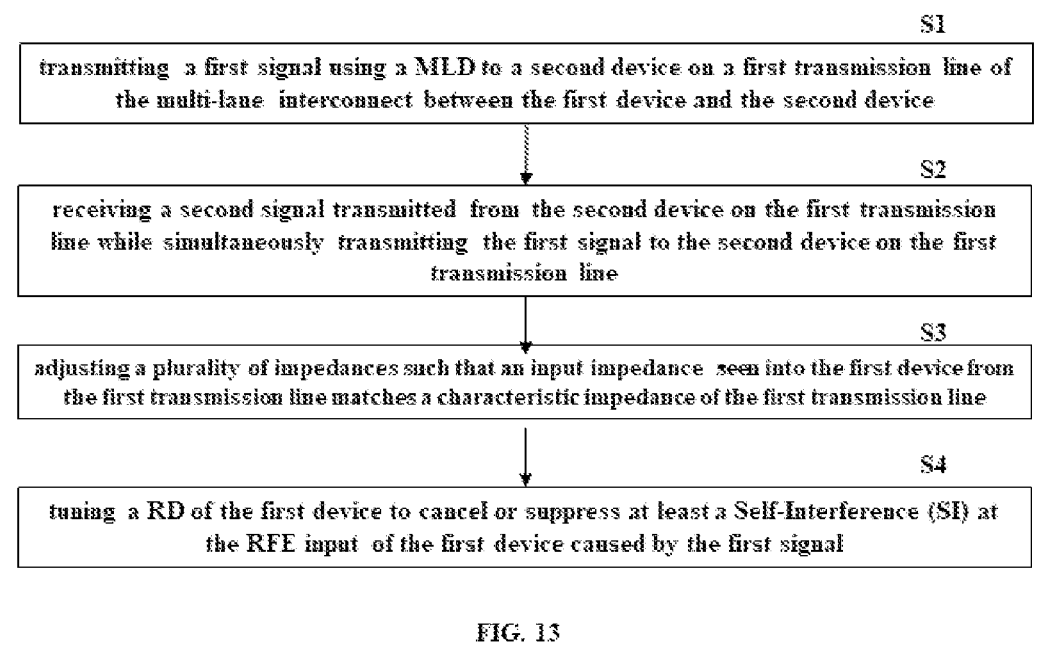

SELF-INTERFERENCE, ECHO AND CROSSTALK MITIGATION IN MULTI-LANE INTERCONNECTS

FIELD OF THE INVENTION

The present application is based on and claims priority from an Indian Provisional Application Number 202321026913 filed on 11 Apr. 2023, the disclosure of which is hereby incorporated by reference herein. The present invention relates to the field of electronics, and more particularly, to a system and method for self-interference, echo and crosstalk cancellation in high-density interconnects.

BACKGROUND

For transmission of digital data at high-speeds, wires or transmission lanes usually carry signals in one direction only at a given time. However, simultaneous transmission of signals in both the directions on a wire or a transmission lane (or a differential transmission line) is also possible, and is also used in a few applications. Bidirectional transfer of the signals can be used for doubling the data-transmission rate in a given lane for a given baud-rate and the modulation format in high-speed high-density wireline interconnects. Simultaneous bidirectional transmission has been used in the Ethernet links for the high-speed data transmission. The Ethernet links typically use passive hybrids (comprising inductors, capacitors, transformers etc.) for subtracting the transmitted signal (called self-interference) and echoes from the received signal (i.e. for removing the self-interference to the first order), before the received signal is further processed. Unfortunately, the Ethernet link hybrids are bulky (and have poor frequency response) and cannot be used for high-density high-speed interconnects. In addition, interconnection networks use multiple lanes (or transmission lines) to transmit high-speed data signals over the multi-lane interconnects in parallel on printed circuit board-based chip-to-chip high-density interconnects or in-package die-to-die high-density interconnects. Use of multiple lanes in interconnection network causes crosstalk due to a signal coupling between nearby transmission lanes running in parallel.

Simultaneous bidirectional data transmission is used for transmitting and receiving the data over the lane simultaneously, between two devices, termed as the first device and the second device as shown in FIG. 1. A signal generated by the transmitter of the first device causes self-interference (SI) and echoes at the receiver of the same device. As shown in FIG. 1, the SI and echoes are copies or components of the original signal that is transmitted by the device, which are available at the receiver (of the same device) along with the desired signal. The echoes are independent of the signal desired at the receiver, which has been transmitted by the other end transmitter, and therefore degrade the receiver's performance.

The echo occurs when a part of the signal coming out of the transmitter of the device returns to the receiver of the same device after being reflected in the lane due to impedance discontinuities in the lane. The SI is termed as the component of the transmitted signal that is available directly at the receiver (i.e. the part of the transmitted signal that does not come after reflections due to the impedance discontinuities to the receiver, but is fed from the transmitter to the receiver at the same side directly). The SI could be a distorted version of the signal that is transmitted or to be transmitted.

For higher data throughput rates (in high-density interconnects), multi-lane interconnects are used, wherein, multiple parallel lanes (also termed as transmission lanes or lanes or simply wires) carry independent data signals between two systems, for example between First device and Second device shown in FIG. 2 and FIG. 3. However, there can be a significant crosstalk (NEXT-near end crosstalk and FEXT-far end crosstalk), due to coupling between the lanes, that are adjacent to each other (as shown in FIGS. 2 and 3), or nearby. Due to crosstalk, in addition to the desired signal, some components of the signals from the nearby lanes are also obtained at the receiver. Each lane consists of a single ended transmission lane (or a wire) or a differential transmission line (a pair of wires). For simplicity, many of the illustrations in this disclosure show single ended transmission lines or circuits only. However, the same inventions are applicable to circuits that use differential signaling and systems with differential transmission lines. The crosstalk is classified as the NEXT when the receiver and the crosstalk causing transmitter are on the same side of the interconnect (from the two different systems, as shown in FIGS. 2 and 3). Similarly, the crosstalk is termed as the FEXT when the receiver and the crosstalk causing the transmitter are on the opposite sides of the interconnect.

The crosstalk can cause significant degradation in the quality of the signals that are obtained at the receivers in high-density or multi-lane interconnects. The crosstalk can affect the receivers that use unidirectional transmission (as shown in FIG. 2), or the receivers that use simultaneous bidirectional data transmission (as shown in FIG. 3), or a mix of the two systems that have some unidirectional lanes and some simultaneous bidirectional lanes. The NEXT is typically much stronger than the FEXT. Especially, in bidirectional links, canceling the NEXT becomes very important. The SI, the echoes and the crosstalk present a huge challenge in recovering the desired signal at the receivers of the simultaneous bidirectional interconnects or multi-lane high-density interconnects. Therefore, the SI, the echoes and the crosstalk have to be suppressed at the receiver before the data transmitted by the far end transmitter can be recovered by the receiver, so that transmitted data is error free or has fewer errors.

Thus, it is desired to address the above-mentioned disadvantages, issues, or other shortcomings or at least provide a useful alternative.

SUMMARY OF THE INVENTION

Accordingly, an embodiment herein provides a system for mitigating an interference signal in a multi-lane interconnect. The device comprises a first device, second device and a multi-lane interconnect circuit. The first device includes a plurality of transceivers, and a ratioed impedance controller. The second device includes a plurality of transceivers and a ratioed impedance controller. The multi-lane interconnect circuit connects the first device with the second device using a multi-lane interconnect, wherein the multi-lane interconnect circuit is one of a single-ended transmission lines circuit and differential-ended transmission lines circuit between the first device and the second device, wherein the multi-lane interconnect circuit is configured to transmit a first signal to the second device on a first transmission line of the multi-lane interconnects. The ratioed impedance controller of the first device is configured to transmit the first signal using a MLD to the second device on the first transmission line of the multi-lane interconnect between the first device and the second device. The ratioed impedance controller of the first device is configured to receive a second signal transmitted from the second device on the first transmission line while simultaneously transmitting the first signal to the second device on the first transmission line, wherein a signal at a RFE input of the first device comes through a ratioed impedance circuit of the first device and comprises the second signal and the interference signal. Further the ratioed impedance controller of the first device is configured to adjust a plurality of impedances such that an input impedance (Zin) seen into the first device from the first transmission line matches a characteristic impedance (Z0) of the first transmission line, and tune a RD of the first device to cancel or suppress at least a SI at the RFE input of the first device caused by the first signal.

In an embodiment, echoes of the first signal are also suppressed by the RD by generating delayed replicas of the first signal, and scaling and adding the delayed replicas to the RFE input of the first device.

In an embodiment, a Near End Cross Talk (NEXT) caused by at least one of the signals transmitted in adjacent lanes are also suppressed by the RD by generating at least one of the original, and delayed replicas of the signals transmitted in the adjacent lanes, and scaling and adding the generated signals to the RFE input of the first device.

In an embodiment, the MLD circuit comprises a plurality of transconductance cells or driver cells each of which is driven by a signal to be transmitted or the signal's delayed replica, wherein the transconductance cells or driver cells are tunable.

In an embodiment, the MLD circuit is configured to transmit a Pulse Amplitude Modulation (PAM) signal with two bits represented by a Most Significant Bit (MSB) and Least Significant Bit (LSB).

In an embodiment, the RD circuit provides a lower current or a lower power than the MLD circuit to generate the RD output to cancel or suppress the SI.

In an embodiment, the first device performs transmit side pre-emphasis equalization by generating the signal to be transmitted and its delayed replicas using multiple transconductance cells or driver cells in the MLD.

In an embodiment, cancelling or suppressing the interference signal at the RFE input of the first device includes correlating the RFE output with the at least one of the original and delayed replicas of the first signal to adjust one or more weight coefficients to tune the strengths of the one or more of the transconductance cells or driver cells in the RD adaptively.

In an embodiment, cancelling or suppressing the interference signal at the RFE input of the first device also includes correlating the RFE output with the at least one of the original and the delayed replicas of the signal transmitted by the first device in adjacent lanes to adjust the weight coefficients to tune the strengths of the one or more of the transconductance cells or driver cells in the RD adaptively to cancel or suppress the NEXT.

Accordingly, an embodiment herein provides a method for mitigating the interference signal in the multi-lane interconnect. The method includes transmitting, by the first device, the first signal using the MLD to the second device on the first transmission line of the multi-lane interconnect between the first device and the second device, wherein the multi-lane interconnect is associated with one of the single-ended transmission line circuit and differential-ended transmission line circuit between the first device and the second device. The method includes receiving, by the first device, the second signal transmitted from the second device on the first transmission line while simultaneously transmitting the first signal to the second device on the first transmission line, wherein a signal at the RFE input of the first device comes through a ratioed impedance circuit of the first device and comprises the second signal and the interference signal. Further, the method includes adjusting, by the first device, the plurality of impedances such that an input impedance (Zin) seen into the first device from the first transmission line matches the characteristic impedance (Z0) of the first transmission line. The method includes tuning, by the first device, the RD of the first device to cancel or suppress at least a SI at the RFE input of the first device caused by the first signal.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

These and other features, aspects, and advantages of the present disclosure are illustrated in the accompanying drawings, throughout which like reference letters indicate corresponding parts in the various figures. The embodiments herein will be better understood from the following description with reference to the drawings, in which:

FIG. 13 is a flow diagram that illustrate a method for mitigating an interference signal in an interconnection network, according to the embodiment disclosed herein.

Figure 1:
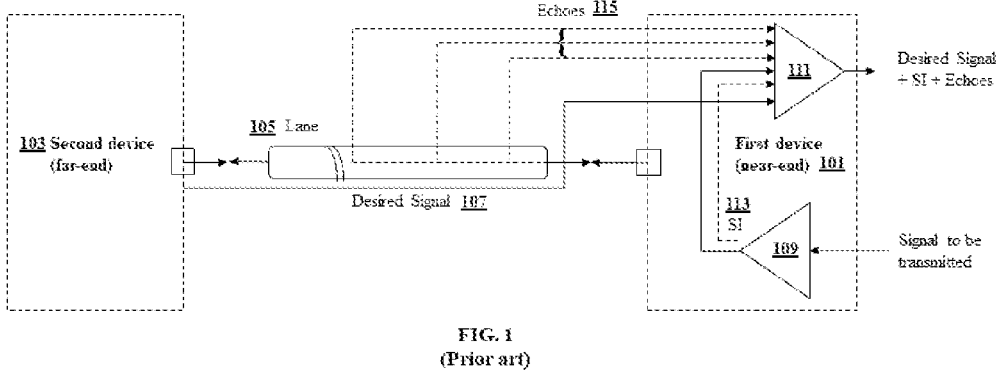
FIG. 1 is a schematic diagram that illustrates self-interference and echoes in multi-lane interconnects, according to the prior art.

It may be noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing may be exaggerated relative to other elements to help to improve the understanding of aspects of the invention. Furthermore, the elements may have been represented in the drawing by conventional symbols, and the drawings may show only those specific details that are pertinent to the understanding the embodiments of the invention so as not to obscure the drawing with details that will be readily apparent to those of ordinary skill in the art having benefit of the description herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments are described and illustrated in terms of blocks that carry out a described function or functions. These blocks, which are referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits constituting a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the proposed method. Likewise, the blocks of the embodiments be physically combined into more complex blocks without departing from the scope of the proposed method.

The accompanying drawings are used to help easily understand various technical features and it is understood that the embodiments presented herein are not limited by the accompanying drawings. As such, the proposed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

Embodiments disclosed herein provides a system for mitigating an interference signal in a multi-lane interconnect. The device comprises a first device, second device and a multi-lane interconnect circuit. The first device includes a plurality of transceivers, and a ratioed impedance controller. The second device includes a plurality of transceivers and a ratioed impedance controller. The multi-lane interconnect circuit connects the first device with the second device using a multi-lane interconnect, wherein the multi-lane interconnect circuit is one of a single-ended transmission lines circuit and differential-ended transmission lines circuit between the first device and the second device, wherein the multi-lane interconnect circuit is configured to transmit a first signal to the second device on a first transmission line of the multi-lane interconnects. The ratioed impedance controller of the first device is configured to transmit the first signal using a MLD to the second device on the first transmission line of the multi-lane interconnect between the first device and the second device. The ratioed impedance controller of the first device is configured to receive a second signal transmitted from the second device on the first transmission line while simultaneously transmitting the first signal to the second device on the first transmission line, wherein a signal at a RFE input of the first device comes through a ratioed impedance circuit of the first device and comprises the second signal and the interference signal. Further the ratioed impedance controller of the first device is configured to adjust a plurality of impedances such that an input impedance (Zin) seen into the first device from the first transmission line matches a characteristic impedance (Z0) of the first transmission line, and tune a RD of the first device to cancel or suppress at least a SI at the RFE input of the first device caused by the first signal.

Embodiments disclosed herein provides a method for mitigating the interference signal in the multi-lane interconnect. The method includes transmitting, by the first device, the first signal using the MLD to the second device on the first transmission line of the multi-lane interconnect between the first device and the second device, wherein the multi-lane interconnect is associated with one of the single-ended transmission line circuit and differential-ended transmission line circuit between the first device and the second device. The method includes receiving, by the first device, the second signal transmitted from the second device on the first transmission line while simultaneously transmitting the first signal to the second device on the first transmission line, wherein a signal at the RFE input of the first device comes through a ratioed impedance circuit of the first device and comprises the second signal and the interference signal. Further, the method includes adjusting, by the first device, the plurality of impedances such that an input impedance (Zin) seen into the first device from the first transmission line matches the characteristic impedance (Z0) of the first transmission line. The method includes tuning, by the first device, the RD of the first device to cancel or suppress at least a SI at the RFE input of the first device caused by the first signal.

The interconnection network uses multiple lanes to transmit high-speed data signals over the multi-lane interconnects in parallel on printed circuit board-based chip-to-chip high-density interconnects or in-package die-to-die high-density interconnects. Use of multiple lanes in interconnection network causes crosstalk due to a signal coupling between nearby transmission lanes running in parallel.

To address this, the proposed technical solution boasts inventive features that involve the method for generating a plurality of ratioed impedances based on an input impedance associated with the second signal transmitted from the second device. These plurality of ratioed impedances are used for cancelling or suppressing the interference signal from the second signal.

FIG. 1 is a schematic diagram that illustrates self-interference and echoes in multi-lane interconnects, according to the prior art.

Simultaneous bidirectional data transmission is used for transmitting and receiving the data over the lane (105) simultaneously, between the two devices, termed as first device (101) and second device (103) as shown in FIG. 1. The transceiver has a transmitter (109) and a receiver (111). A first signal generated by the transmitter of the first device (101) causes self-interference (SI) (113) and echoes (115) at the receiver (111) of the first device (101). As shown in FIG. 1, the SI (113) and echoes (115) are copies or components of the original signal that is transmitted by the first device (101), which are available at the receiver of the same device along with the desired signal. The echoes (115) are independent of the signal desired at the receiver (111), which has been transmitted by the other end transmitter, and therefore degrade the receiver's performance.

Figure 2:
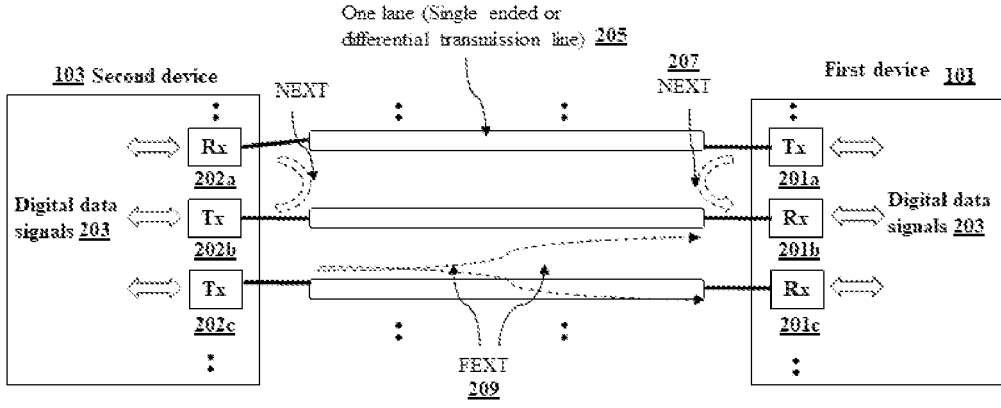
FIG. 2 is a schematic diagram that illustrates NEXT and FEXT from adjacent lanes in multi-lane interconnects with unidirectional data signal transmission in different lanes, according to the prior art.

FIG. 2 is a schematic diagram that illustrates NEXT and FEXT from adjacent lanes in multi-lane interconnects with unidirectional data signal transmission in different lanes, according to the prior art.

For higher data throughput rates in high-density interconnects, multi-lane interconnects are used. FIG. 2 illustrates first device (101) and second device (103) connected by multiple parallel lanes carrying independent digital data signals (203) between two devices. The multiple parallel lanes can be a single ended or differential transmission lines. The First device (101) comprises a first transmitter (201*a*), a first receiver (201*b*) and a second receiver (201*c*) and the Second device (103) comprises a first receiver (202*a*), a first transmitter (202*b*) and a second transmitter (202*c*). However, there can be a significant crosstalk due to coupling between the transmission lanes, that are adjacent to each other. The crosstalk can be a near end crosstalk (NEXT) (207) and a far end crosstalk (FEXT) (209). If the receiver and the crosstalk causing transmitter are on the same side of the interconnect, it is termed as the NEXT (207). Similarly, if the receiver and the crosstalk causing transmitter are on the opposite sides of the interconnect, it is termed as the FEXT (209). Due to the crosstalk, in addition to the desired signal, some components of the signals from the nearby transmission lanes are also obtained at the receiver.

For simplicity, many of the illustrations in this disclosure show single ended transmission lines or circuits only. However, the same inventions are applicable to circuits that use differential signalling and systems with differential transmission lines.

Figure 3:
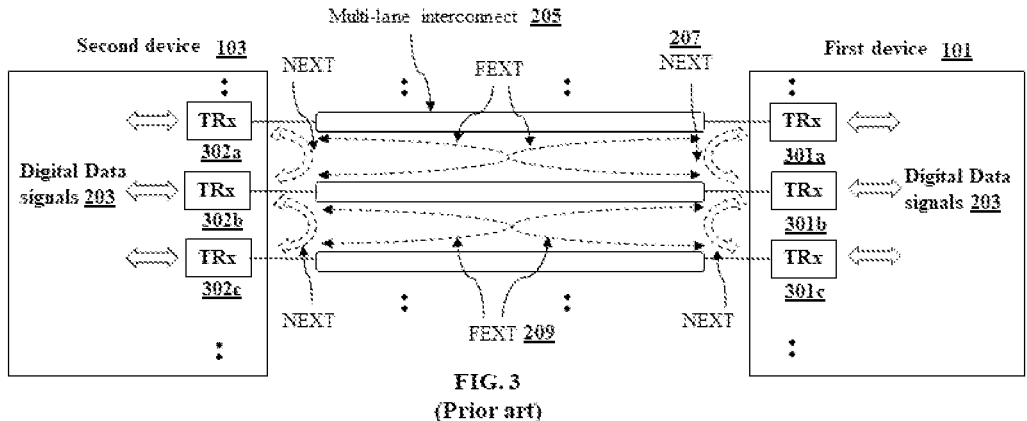
FIG. 3 is a schematic diagram that illustrates NEXT and FEXT from adjacent lanes in multi-lane interconnects with simultaneous bi-directional transmission of signals in different lanes, according to the prior art.

FIG. 3 is a schematic diagram that illustrates NEXT and FEXT from adjacent lanes in multi-lane interconnects with simultaneous bi-directional transmission of signals in different lanes, according to the prior art.

FIG. 3 illustrates first device (101) and second device (103) connected by multiple parallel lanes carrying independent digital data signals (203) between two devices. The multiple parallel lanes can be a single ended or differential transmission lines. The First device (101) comprises a first transceiver (301*a*), a second transceiver (301*b*) and a third transceiver (301*c*) and the Second device (103) comprises a first transceiver (302*a*), a second transceiver (302*b*) and a third transceiver (302*c*). However, there can be a significant crosstalk due to coupling between the transmission lanes, that are adjacent to each other. The crosstalk can be the NEXT (207) and the FEXT (209). If the receiver and the crosstalk causing transmitter are on the same side of the interconnect, it is termed as the NEXT (207). Similarly, if the receiver and the crosstalk causing transmitter are on the opposite sides of the interconnect, it is termed as the FEXT (209). Due to the crosstalk, in addition to the desired signal, some components of the signals from the nearby transmission lanes are also obtained at the receiver.

Figure 4:
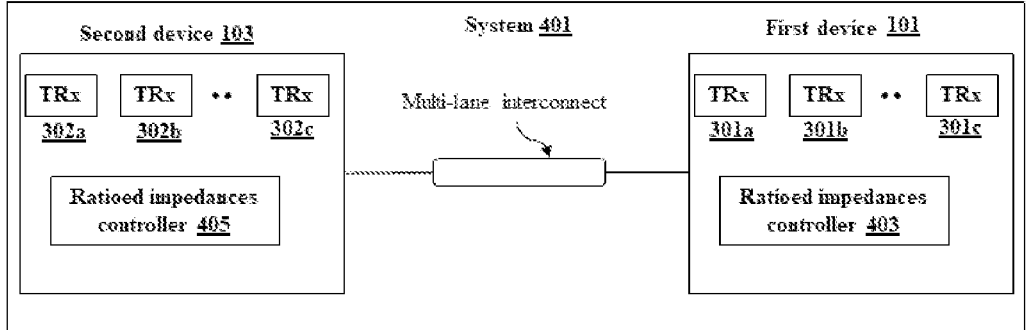
FIG. 4 is a block diagram that illustrates various hardware components of the device for self-interference, echo and crosstalk cancellation in high-density interconnects, according to the embodiment disclosed herein.

FIG. 4 is a block diagram illustrating various hardware components of the system for mitigating an interference signal in an interconnection network, according to the embodiment disclosed herein. The system (401) comprises a first device (101) comprising a plurality of transceivers (301*a*, 301*b*, 301*c*) and a ratioed impedances controller (401) and a second device (103) comprising a plurality of transceivers (302*a*, 302*b*, 302*c*) and a ratioed impedances controller (403 and 405). The system further comprises a multi-lane interconnects circuit connecting the first device (101) with the second device (103). The multi-lane interconnects circuit is one of a single-ended transmission lines circuit and differential-ended transmission lines circuit between the first device (101) and the second device (103). The multi-lane interconnects circuit is configured to transmit a first signal to the second device (103) on a first transmission lane of the multi-lane interconnects. At least one of transceiver of the plurality of transceivers (301*a*, 301*b*, 301*c*) of the first device (101) configured to transmit a first signal to the second device (103) on a first transmission lane of the multi-lane interconnects. Further, the transceiver is configured to receive a second signal transmitted from the second device (103) on the first transmission lane while simultaneously transmitting the first signal to the second device (103) on the first transmission lane. The second signal comprises the interference signal from at least one second transmission lane adjacent to the first transmission lane in the multi-lane interconnects. The ratioed impedances controller (403) of the first device (101) is configured to transmit the first signal using the MLD to the second device (103) on the first transmission line of the multi-lane interconnect between the first device (101) and the second device (103). The ratioed impedance controller (403) of the first device (101) is configured to receive the second signal transmitted from the second device (103) on the first transmission line while simultaneously transmitting the first signal to the second device (103) on the first transmission line, wherein the signal at the RFE input of the first device (101) comes through the ratioed impedance circuit of the first device (101) and comprises the second signal and the interference signal. Further the ratioed impedance controller (403) of the first device (101) is configured to adjust a plurality of impedances such that an input impedance (Zin) seen into the first device (101) from the first transmission line matches a characteristic impedance (Z0) of the first transmission line, and tune the RD of the first device (101) to cancel or suppress at least a SI at the RFE input of the first device (101) caused by the first signal.

The ratioed impedances controller (403) is an innovative hardware that is realized through the physical implementation of both analog and digital circuits, including logic gates, integrated circuits, microprocessors, microcontrollers, memory circuits, passive and active electronic components, as well as optical components.

In an embodiment, echoes of the first signal are also suppressed by the RD by generating delayed replicas of the first signal, and scaling and adding the delayed replicas to the RFE input of the first device (101).

In an embodiment, a Near End Cross Talk (NEXT) caused by at least one of the signals transmitted in adjacent lanes are also suppressed by the RD by generating at least one of the original, and delayed replicas of the signals transmitted in the adjacent lanes, and scaling and adding the generated signals to the RFE input of the first device (101).

In an embodiment, the MLD circuit comprises a plurality of driver cells or driver cells each of which is driven by a signal to be transmitted or the signal's delayed replica, wherein the transconductance cells or driver cells are tunable.

In an embodiment, the MLD circuit is configured to transmit a Pulse Amplitude Modulation (PAM) signal with two bits represented by a Most Significant Bit (MSB) and Least Significant Bit (LSB).

In an embodiment, the RD circuit provides a lower current or a lower power than the MLD circuit to generate the RD output to cancel or suppress the SI.

In an embodiment, the first device (101) performs transmit side pre-emphasis equalization by generating the signal to be transmitted and its delayed replicas using multiple transconductance cells or driver cells in the MLD.

In an embodiment, cancelling or suppressing the interference signal at the RFE input of the first device (101) includes correlating the RFE output with the at least one of the original and delayed replicas of the first signal to adjust one or more weight coefficients to tune the strengths of the one or more of the transconductance cells or driver cells in the RD adaptively.

In an embodiment, cancelling or suppressing the interference signal at the RFE input of the first device (101) also includes correlating the RFE output with the at least one of the original and the delayed replicas of the signal transmitted by the first device (101) in adjacent lanes to adjust the weight coefficients to tune the strengths of the one or more of the transconductance cells or driver cells in the RD adaptively to cancel or suppress the NEXT.

In an embodiment, the system for cancelling or suppressing the interference signal from the second signal based on the plurality of ratioed impedances comprises scaling. The first device (101) scales the second signal based on the MLD output impedance and the RD output impedance to obtain a scaled second signal. The system further comprises cancelling or suppressing, by the first device (101), the interference signal from the scaled second signal based on the RFE input impedance and a plurality of interference mitigation parameters.

In an embodiment, the plurality of interference mitigation parameters comprises at least one of echo components of the first signal, NEXT components of the second signal from the at least one second transmission lane adjacent to the first transmission lane in the multi-lane interconnects, FEXT components of the second signal from the at least one second transmission lane adjacent to the first transmission lane in the multi-lane interconnects, and a replicas of the echo components of the first signal from the at least one first transmission lane adjacent to the second transmission lane in the multi-lane interconnects.

In an embodiment, the echo component is analyzed and separated from the first signal by the first device (101) to identify various characteristics comprising at least one of delay and amplitude of the echo component in the first signal.

In an embodiment, the NEXT components comprise at least one of amplitude, frequency, and phase of signals at the first device (101) from the first transmission lane that interfere with signals from the at least one second transmission lane adjacent to the first transmission lane.

In an embodiment, the NEXT components comprises at least one of amplitude, frequency, and phase of signals at the second device (103) from the first transmission lane that interfere with signals from the at least one second transmission lane adjacent to the first transmission lane.

In an embodiment, the replicas of the echo components comprise reflections or echoes of the first signal that are present in the at least one first transmission lane adjacent to the second transmission lane. The replicas of the echo components occur due to a physical proximity of lanes in the multi-lane interconnects and cause the interference with second signal being received in the first transmission lane while transmitting the first signal in the first transmission lane.

In an embodiment, the first device (101) performs an equalization to overcome distortion of the second signal for higher frequency components of the second signal caused by a larger time constant at the RFE circuit.

In an embodiment, the system for cancelling or suppressing the interference signal from the scaled second signal based on the RFE input impedance and the plurality of interference mitigation parameters comprises correlating operation. The first signal is correlated with delayed replicas of the first signal. The signals transmitted from the at least one second transmission lane adjacent to the first transmission lane are correlated with the second signal based on the RFE input impedance and the plurality of interference mitigation parameters. The system further comprises cancelling or suppressing, by the first device (101), the interference signal from the scaled second signal based on the correlating.

Figure 5:
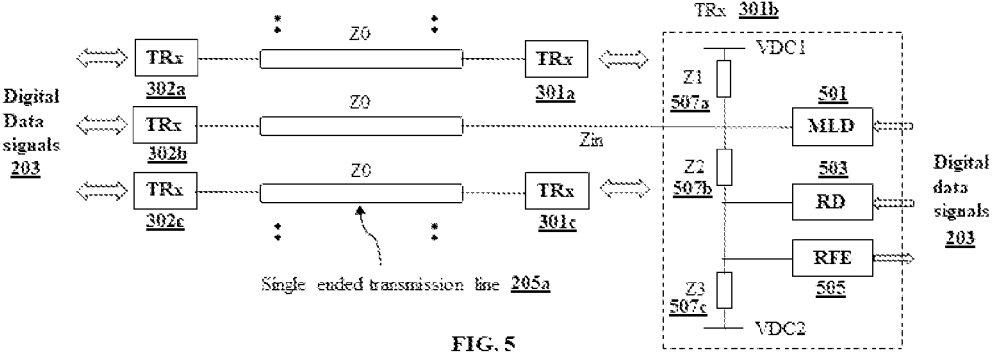
FIG. 5 is a schematic diagram that illustrates RD based transceiver frontend for SI/echo/crosstalk cancellation with single ended transmission lines, according to the embodiment disclosed herein.

FIG. 5 is a schematic diagram that illustrates RD circuit-based transceiver frontend for SI/echo/crosstalk cancellation with single ended transmission lines, according to the embodiment disclosed herein.

Figure 6:
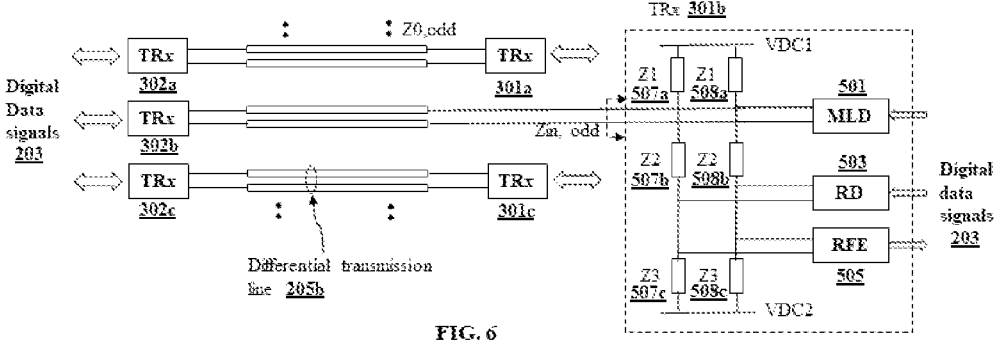
FIG. 6 is a schematic diagram that illustrates RD based transceiver frontend for SI/echo/crosstalk cancellation with differential transmission lines, according to the embodiment disclosed herein.

FIG. 6 is a schematic diagram that illustrates RD circuit-based transceiver frontend for SI/echo/crosstalk cancellation with differential transmission lines, according to the embodiment disclosed herein.

Referring to FIG. 5 and FIG. 6, the proposed method includes the SI, echo and/or crosstalk cancellation using ratioed drivers (RD). In this approach, the transceiver (TRx) (301*b*) launches the first signal using a MLD circuit (501)

into the transmission lane. As shown in the example embodiment in FIG. 5, for the given transceiver (301*b*) and for the single ended transmission line (205*a*), the ratioed impedances a MLD output impedance (Z1) (507*a*), a RD output impedance (Z2) (507*b*) and Receiver Front End (RFE) input impedance (Z3) (507*c*) scales the transmitted signal(s) and the second signal in the transmission lane from the second device (103), by certain factors. Similarly, as shown in the example embodiment in FIG. 6, for the given transceiver (301*b*) and for the differential transmission line (205*b*), the ratioed impedances Z1 (507*a*), Z2 (507*b*), Z3 (507*c*) are connected in parallel with the ratioed impedances Z1 (508*a*), Z2 (508*b*), Z3 (508*c*) to scale the transmitted signal(s) and the second signal in the transmission lane from the second device (103), by certain factors. At the RFE circuit (505) input, scaled down copy of the first signal from the same TRx (301*b*) is present. The scaled down copy causes self-interference (SI) at the RFE circuit (505) input. The RD circuit (503) generates the scaled copy of the transmitted signal in one embodiment and in other embodiments, some more scaled and delayed copies of these signals, and adds or subtracts them at the RFE circuit (505) input in such a way that the SI component in the RFE circuit (505) input is nullified or cancelled, to a large extent. Similarly, the RFE circuit (505) input also contains effectively scaled and delayed components of the first signal (i.e. echoes) and the NEXT components of the first signals from the adjacent lanes. The RD circuit (501) also generates copies of these first signals and adds or subtracts them from the signal at the RFE circuit (505) input in such a way that the RFE circuit (505) input does not have significant amounts of echo and NEXT components.

The impedances Z1, Z2 and Z3 are chosen in such a way that the impedance seen from the transmission lane side is matched to or equal to the impedance seen into the transceiver frontend. For example, impedance Zin is equal to the characteristic impedance Z0 in case of single ended transmission line (205*a*) circuit shown in FIG. 5. Similarly, odd-mode impedance Zin, odd is equal to the odd-mode characteristic impedance Z0, odd of the transmission lane, in case of differential transmission line (205*b*) circuit, as shown in FIG. 6.

In an embodiment, the odd-mode impedance of a differential transmission line (205*b*) circuit, having a positive terminal and a negative terminal, is defined as Zin, odd= (Vp–Vn)/(Ip–In), wherein Vp and Vn are the voltages applied to the positive and the negative terminals of a differential circuit, and Ip and In are the currents flowing into the positive and negative terminals of the differential circuit, respectively. In other words, Zin, odd is equal to half of the differential impedance across the positive and negative terminals of a differential circuit. Henceforth, in the description, the odd-mode input impedance Zin, odd of a differential circuit can also be referred to as the input impedance of the circuit or Zin which was used as input impedance in the context of single ended circuits as shown in FIG. 5. The definition of odd-mode characteristic impedance (Z0, odd) of the differential transmission lines is already well known.

In an embodiment, echoes of the transmitted signal at the RFE circuit (505) input are also canceled by subtracting delayed and scaled copies of the transmitted signal using the ratioed driver (503) shown in the FIG. 5. Similarly, NEXT can also be canceled at the RFE circuit (505) input by subtracting delayed and scaled copies of the nearby first signals using the ratioed driver (503). The impedances Z1, Z2, and Z3 are chosen in such a way that the ratioed driver has to provide a much lower current or use much lower power than the MLD circuit (501), to cancel or suppress the self-interference, echoes and/or crosstalk. For this to happen, $|(Z1||Zout, MLD)|<|Z2|<|(Zout,RD||Zin,RFE||Z3)|$, in the frequency range of interest, which is typically between F_low to F_high, wherein F_low and F_high are the minimum and maximum values of the frequencies between which most of the signal and interferer power spectrum lies. For example, if the signal baud-rate is R, F_low can be taken as R/1000 and F_high can be taken as R/1.4. From power efficiency perspective, preferably, $|(Z1||Zout, MLD)|<0.6\times|Z2|<0.3\times|(Zout,RD||Zin,RFE||Z3)|$; and for a more power efficient system, $|(Z1||Zout,MLD)|<0.4\times|Z2|<0.2\times|(Zout, RD||Zin,RFE||Z3)|$. However, in the latter case, larger effective impedance is seen at the RFE input node, which results in a larger time constant at that node and therefore more distortion of the second signal, particularly for higher frequency components of it. This effect can be overcome using standard equalization techniques used by receivers in high-speed interconnects.

In an embodiment, in addition to the power efficiency considerations, another condition needs to be met in order to achieve good impedance match at the first device (101) and the transmission-line interface. This is important to prevent any reflections of the signals coming in towards the first device (101) from the transmission lane to reduce the echoes. For a good impedance match, a. when the MLD circuit (501), the RD circuit (503) have infinite (or practically infinite) output impedances, and the RFE circuit (505) has practically infinite input impedance, the following condition needs to be satisfied:

$$Zin = Z1||(Z2 + Z3) = Z0.$$

b. when the MLD circuit (501), the RD circuit (503) have finite output impedances Zout,MLD and Zout,RD respectively, and the RFE circuit (505) has finite input impedance Zin,RFE, the following condition needs to be satisfied:

$$Zin = (Z1||Zout, MLD)||(Z2 + (Zout, RD||Zin, RFE||Z3)) = Z0.$$

In an embodiment, the mentioned impedances are complex. However, at low frequencies, the imaginary components in these impedances can be ignored because the parasitic capacitance and inductance effects at these frequencies are not significant. In such cases, Z1, Z2, and Z3 can be realized using passive resistors. However, very high-speed signals, capacitors or inductors are also need to be added to the resistor network to achieve good impedance match, good SI, echo and/or crosstalk suppression, and receive good signal quality at the RFE circuit input, simultaneously.

The resistors, capacitors and inductors can also be made digitally trimmable, wherein switches with digital control bits are added to increase or decrease the values of these resistors and capacitors for proper SI, echo and/or crosstalk suppression, and impedance matching.

Also, in order to cancel the effect of SI, echoes and/or crosstalk, the RD circuit strength has to be chosen in such a way that the SI, echo and/or crosstalk components are nullified at the input of the RFE.

Figure 7:
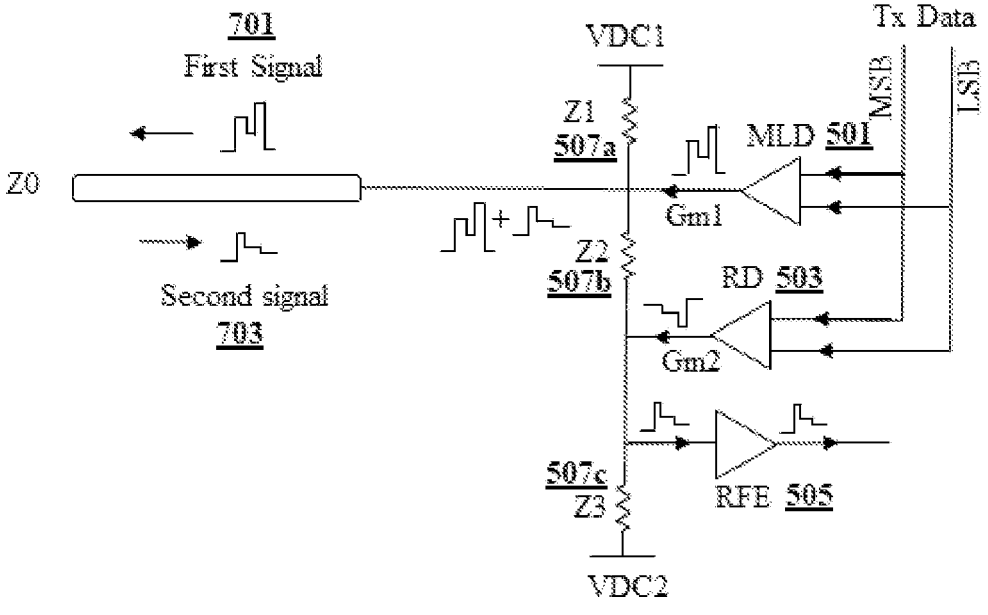
FIG. 7 is a schematic diagram that illustrates a single-ended version of the transceiver frontend with resistors (i.e. real-valued impedances), according to the embodiment disclosed herein.

FIG. 7 is a schematic diagram that illustrates a single-ended version of the transceiver frontend with resistors (i.e. real-valued impedances), according to the embodiment disclosed herein;

Referring to FIG. 7, a single ended version has been shown for simplicity, while the actual implementation can be single ended or differential. The transconductance (Gm) cells Gm1 and Gm2 as shown in the figure each physically consist of two parallel binary weighted Gm cells for Pulse Amplitude Modulation (PAM)-4 modulated signals. In this example, the MLD circuit comprises binary weighted transconductance cells or driver cells connected to the MSB and LSB signals to generate a PAM-4 signal. Because of binary weightage, the current provided by the MLD circuit (501) is (MSB+0.5×LSB)×Gm1. Similarly, the current provided by the RD circuit (503) is (MSB+0.5×LSB)×Gm2, but in the opposite direction. The signals are applied with polarities in such a way that when the MLD circuit (501) is sourcing some current, the RD circuit (503) is sinking a scaled version of it, and vice-versa. It should be noted that the magnitude of Gm2 is significantly smaller than that of Gm1, when the impedance values Z1 (507a), Z2 (507a) and Z3 (507a) are chosen using the criteria described above. In this example, it is assumed that there is no significant signal distortion due to parasitic capacitance etc. The RD circuit (503) can cancel the effect of SI, at the RFE circuit (505) input, which is assumed to be of practically infinite input impedance in this case. As an embodiment of this example, if Z0=50 ohms, Z1=60 ohms and Z2=120 ohms, Zin=Z1∥(Z2+Z3)=Z0=50 ohms. This gives the value of Z3=180 ohms.

For perfect impedance match at the transmission lane and transceiver interface, Zin=Z1∥(Z2+Z3)=Z0.

Also, the voltage generated at the RFE input node (which is basically the SI) due to the current coming out of MLD=Gm1×(MSB+LSB/2)×Z3×(Z1∥Z0)/[(Z1∥Z0)+Z2+Z3]. This voltage should be nullified by the voltage generated at the RFE input node, by the RD output current.

This voltage is, Gm2×(MSB+LSB/2)×[((Z1∥Z0)+Z2)∥Z3]
Equating the two: Gm2=Gm1×(Z1∥Z0)/[(Z1∥Z0)+Z2]

In the example discussed earlier, wherein Z0=50 ohms, Z1=60 ohms and Z2=120 ohms, which results in the desired value of Z3 to be 180 ohms, Gm2 is Gm2=0.204×Gm1.

To avoid any reflections, Zin is kept equal to Z0, it can be beneficial to choose a slightly larger value of Zin, so that it improves the signal amplitude observed at the receiver. More specifically, to achieve this, the nominal value of Zin can be chosen to be greater than 1.04×Z0. For this, the value of Z0 used in the equations above, can be substituted by a slightly larger value. However, increasing Zin by a large amount leads to significant amplitude of reflections that cause an undesirably large amplitude of echoes. Therefore, preferably, the magnitude of Zin should be kept below 1.5×Z0.

In an embodiment, due to variability in integrated circuits, it is difficult to achieve the designed values perfectly. The strength of the RD circuit (i.e. the value of Gm2 in this example) can be made tunable to achieve maximum suppression of SI, at the input node of the RFE. The strength of the RD circuit can be tuned adaptively using digital control bits or an analog control loop.

Figures 8, 9:
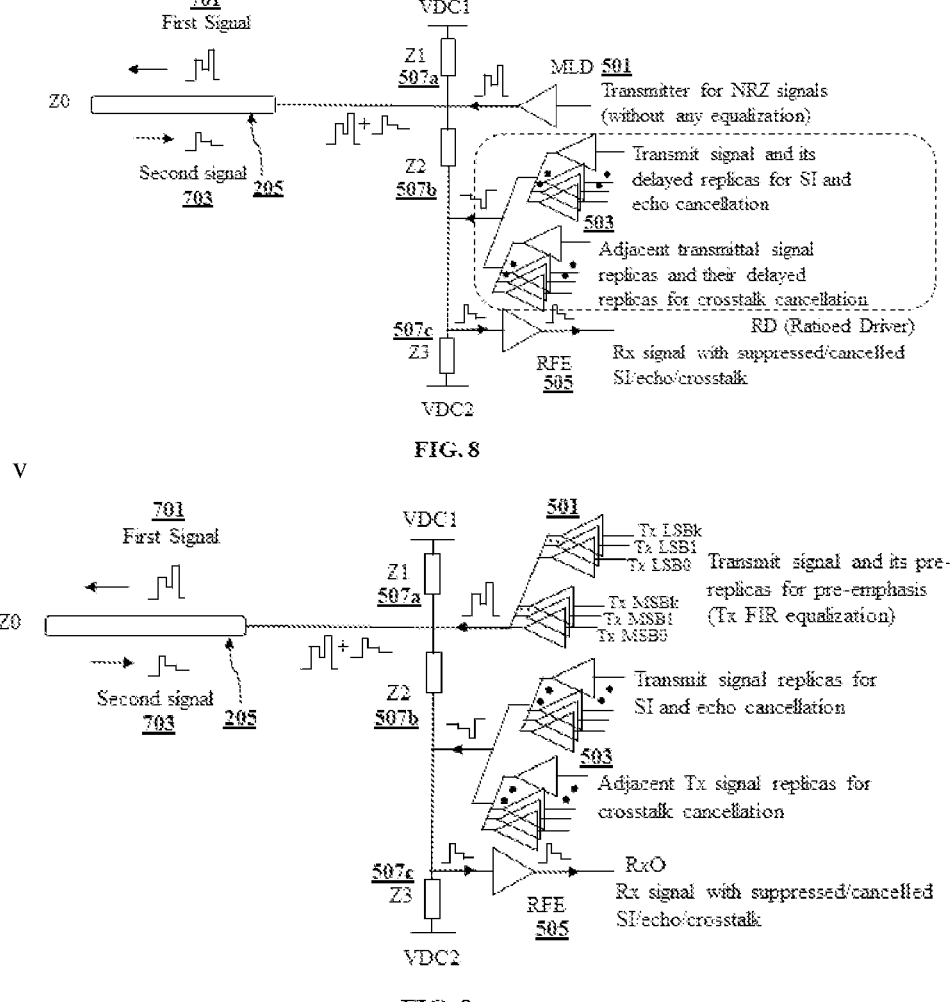
FIG. 8 is a schematic diagram that illustrates the transceiver frontend showing the RD comprising several transconductance cells or driver cells aimed at suppressing or nullifying the SI, echoes and crosstalk from adjacent lanes, according to the embodiment disclosed herein.
FIG. 9 is a schematic diagram that illustrates the transceiver frontend showing the MLD comprising several transconductance cells or driver cells aimed at transmitting an equalized or partially equalized version of the signal to be transmitted, according to the embodiment disclosed herein.

FIG. 8 is a schematic diagram that illustrates the transceiver frontend showing the RD circuit (503) comprising several transconductance cells or driver cells aimed at suppressing or nullifying the SI, echoes and crosstalk from adjacent lanes, according to the embodiment disclosed herein. The RD circuit (503) comprises multiple transconductance cells or driver cells connected in parallel driven by the signal being transmitted and its delayed components to nullify the SI, echoes. The RD circuit (503) also comprises multiple transconductance cells or driver cells connected in parallel driven by the signal being transmitted and its delayed components to nullify the crosstalk. The transconductance cell strengths and/or impedances have to be adjusted adaptively to ensure good suppression of SI, echoes and/or crosstalk at the RFE circuit (505) using the methodology described earlier.

FIG. 9 is a schematic diagram that illustrates the transceiver frontend showing the MLD circuit comprising several transconductance cells or driver cells aimed at transmitting an equalized or partially equalized version of the signal to be transmitted, according to the embodiment disclosed herein.

The MLD circuit (501) itself comprises multiple transconductance (Gm) cells, to achieve transmit side equalization. The transmit side equalization also sometimes referred to as pre-equalization or pre-emphasis equalization, and multi-level signalling. For this, the different transconductance cells or driver cells are driven by the signal to be transmitted and its delayed replicas. These transconductance cells or driver cells also have to be made tuneable. FIG. 9 shows an embodiment of the MLD circuit (501) that can be used for transmitting PAM-4 signals, with the two bits represented by MSB and LSB. The MSBn and LSBn (n being an integer greater than 0) represents nth delayed replicas of signals representing the MSB and the LSB, respectively, for the pre-equalization of the signal. In another embodiment, the MLD circuit (501) is be used for transmitting duo-binary signals, in which the two transconductance cells (Gm cells) or driver cells for a given symbol are of equal strengths, and the cells corresponding to the kth delayed replicas are also mutually of equal strengths.

Figures 10, 11A, 11B, 11C, 11D, 12A, 12B, 12C:
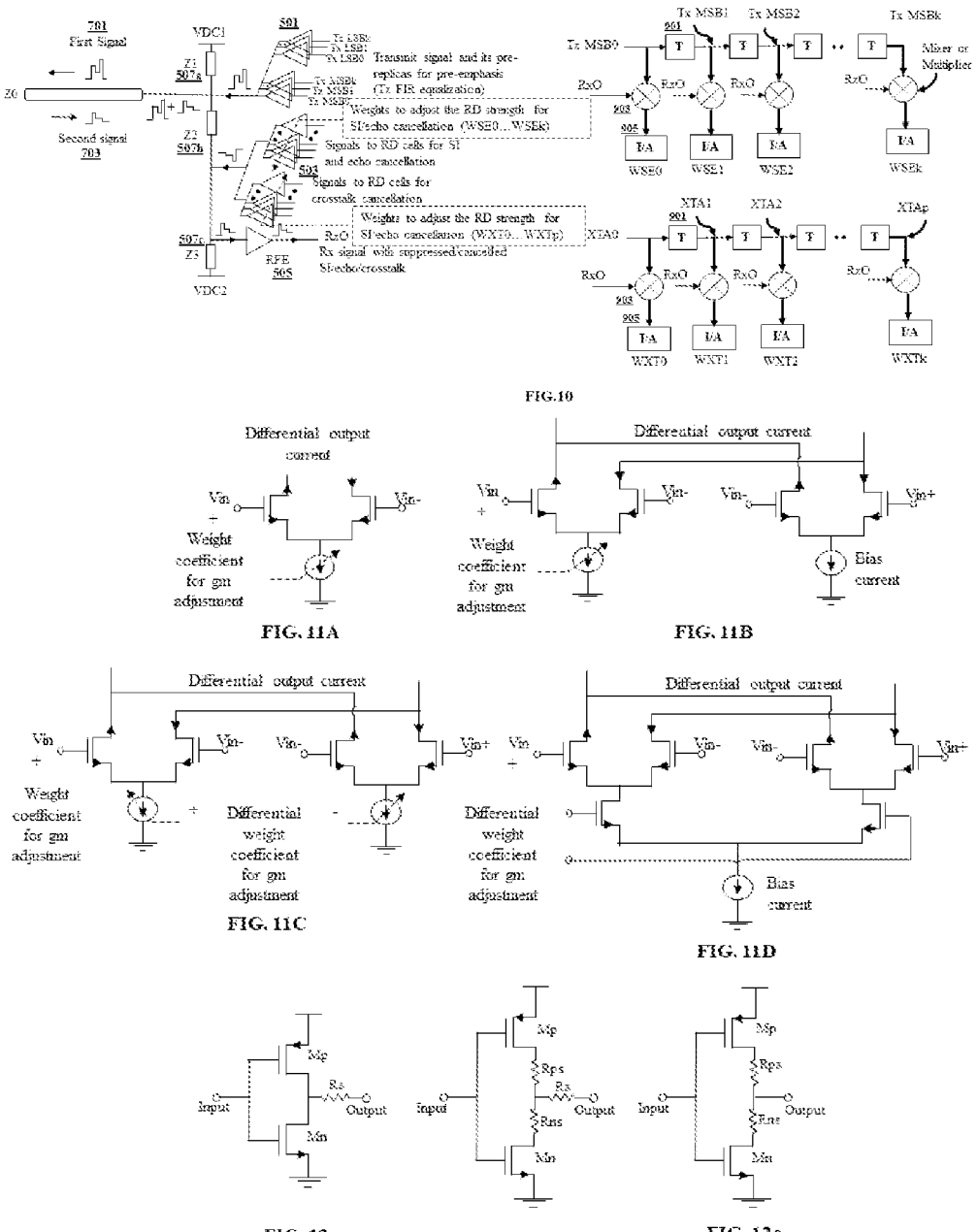
FIG. 10 is a schematic diagram that illustrates the transceiver frontend showing how the weight coefficients, which adjust the RD transconductance cell strengths for achieving the desired amount of SI/echo and/or crosstalk cancellation, can be generated, according to the embodiment disclosed herein.
FIG. 11A-D is are schematic diagrams that illustrates few examples of Gm cells with NMOS transistor implementation with differential outputs, according to the embodiment disclosed herein.
FIG. 12A-C are schematic diagrams that illustrates special inverters with a combination of series resistors Rs, Rps, and/or Rns, according to the embodiment disclosed herein.

FIG. 10 is a schematic diagram that illustrates the transceiver frontend showing how the weight coefficients, which adjust the RD circuit transconductance cell strengths for achieving the desired amount of SI/echo and/or crosstalk cancellation, can be generated, according to the embodiment disclosed herein. Referring to FIG. 10, I/A (905) represents an integrator or an amplifier with a low pass filter, T (901) represents the Transmit block. The Tx MSB0, Tx MSB1, . . . Tx MSBk represents the first signal MSB and its delayed copies and WSE0, WSE1, . . . WSEk represent the weight coefficients for SI and echo cancellation. The WXT0, WXT1, . . . WXTk represents the weight coefficients for crosstalk cancellation.

In an embodiment, the strengths of the Gm cells or the drivers have to be tuned or adjusted in such a way that the self-interference, echo and crosstalk are minimal at the RFE circuit (505) input. For minimizing them, the original and delayed copies of the first signal that is transmitted and the signal transmitted from the adjacent lane can be correlated with the second signal. For correlation, the first signals and their delayed replicas are multiplied with the signal at the RFE circuit (505) output, and are integrated or low-pass filtered, as shown in FIG. 10. The low pass bandwidth can be 100 times or more lower than the baud rate of the data signals. The multiplier (903) can be implemented using a mixer in analog domain or a multiplier in the digital domain, or an XOR gate in the analog or digital domain. Similarly, the integrator (905) or the low-pass filter can be implemented either in the digital domain or the analog domain, or a combination of the two. For simplifying the hardware, the multiplier (903) outputs are sampled as 1-bit values or as low precision few-bit digital samples that are integrated or accumulated and/or are low pass filtered in the digital domain. For obtaining delayed replicas of the first signals, the signals can be passed through clocked D-latches or flip-flops. FIG. 10 shows only one crosstalk signal (XTA0) from a nearby transmitter and its delayed replicas (XTA1, XTA2, . . . XTAp). However, there can be more nearby transmitters that produce significant crosstalk at the receiver of a given device, and hence multiple such delay chains can be used.

FIG. 11 is a schematic diagram that illustrates few examples of Gm cells with NMOS transistor implementation with differential outputs, according to the embodiment disclosed herein. Similar implementations are possible using PMOS transistors. The weight coefficients generated by the correlators and integrators/amplifiers are used for adjusting the currents, and therefore Gm values of the transconductance cells or driver cells. The differential transconductance cells or driver cells are implemented using transistors, as shown in FIG. 11. Few embodiments have been shown, many such other similar embodiments are possible. These Gm cells are connected in parallel to implement the MLD circuit or the RD circuit. The strengths of the Gm cells are tuned by varying the bias currents in the Gm cells, and the tuning controls can come from the weight control adjustment module, some of the embodiments of which are shown in FIG. 10 as discussed earlier. These controls are digital signals and the tuning is done digitally, by turning on or off current sources connected in parallel to represent the overall current source.

FIG. 12 is a schematic diagram that illustrates special inverters with a combination of series resistors Rs, Rps, and/or Rns according to the embodiment disclosed herein. These inverters are driven by one or more inverters, to match the delays, drive capability and get the correct sign (positive or negative) of the signal to get the desired output. The MLD circuit and the RD circuit are implemented as transconductance cells or driver cells, some of the embodiments of which are shown in FIG. 12. To adjust for the strengths of the drivers, the resistor values Rs, Rps and/or Rns can be adjusted to get the desired driver strengths. These transconductance cells or driver cells are equivalently be considered as Gm cells with parallel equivalent impedances which are equal to their respective output impedances. The overall impedance of the MLD circuit or the RD circuit in that case is equivalent to the impedance value obtained by keeping these impedances in parallel.

In an embodiment, each resistor can be tuned by using analog voltage tunable or digitally switchable series or parallel resistors within the resistors (i.e. a network of analog tunable or digitally switchable resistors are used to represent Rs, Rns and/or Rps). When the resistance of the switching transistors of the drivers Mp and Mn are negligible, the effective output impedances of the drivers shown in FIG. 12a is Rs in both logic high and logic low output states. Similarly, for the driver shown in FIG. 12b, the effective output impedance is Rps+Rs in logic high output state and Rns+Rs in logic low output state. For the driver shown in FIG. 12c, the effective output impedance is Rps in logic high output state and Rns in logic low output state. A stronger driver implies that the effective output impedance of the driver is smaller because it is able to source or sink more current. Eventually, the adjusted value of the impedances should be such that the impedance seen from the transmission lane into the device (Zin) is close to the characteristic impedance of the transmission lane Z0. The MLD circuit is able to drive a sufficient amplitude signal onto the transmission lane and the RD circuit is able to cancel or reduce the effects of the SI, echoes and crosstalk on the RFE circuit inputs.

To avoid any reflections, Zin is kept equal to Z0. This can be beneficial to choose a slightly larger value of Zin, so that it improves the signal amplitude observed at the receiver. More specifically, to achieve this, the nominal value of Zin can be chosen to be greater than 1.04×Z0.

In an embodiment, the RFE circuit is implemented using a combination of one or more types of equalizers, such as a Continuous Time Linear Equalizer (CTLE), a Feed Forward Equalizer (FFE) and a Decision Feedback Equalizer (DFE). Also, a t-coil network is added just before the I/O (input/ output) bond pads on the chip to support larger bandwidth of the circuit. It is also useful to implement the RFE circuit and/or the MLD circuit using digital to analog converters when the number of taps for the SI, echo and/or crosstalk cancellation are too many or a lot of pre-equalization is needed. In this case, the weight coefficient adjustment algorithm is carried out in the digital domain. Similarly, it is helpful to implement the RFE circuit in the digital domain after using an analog-to-digital converter, particularly when the lane losses are very high or there is a significant amount of the SI, echo and/or crosstalk that cannot be canceled in the analog domain.

FIG. 13 is a flow diagram that illustrate a method for mitigating an interference signal in an interconnection network, according to the embodiment disclosed herein. At step S1, the first device (101) transmits the first signal using the MLD to the second device (103) on the first transmission line of the multi-lane interconnect between the first device (101) and the second device (103), wherein the multi-lane interconnect is associated with one of the single-ended transmission line circuit and differential-ended transmission line circuit between the first device (101) and the second device (103).

At step S2, the first device (101) receives the second signal transmitted from the second device (103) on the first transmission line while simultaneously transmitting the first signal to the second device (103) on the first transmission line, wherein a signal at the RFE input of the first device (101) comes through a ratioed impedance circuit of the first device (101) and comprises the second signal and the interference signal.

At step S3, the first device (101) adjusts the plurality of impedances such that an input impedance (Zin) seen into the first device (101) from the first transmission line matches the characteristic impedance (Z0) of the first transmission line.

At step S4, the first device (101) tunes the RD of the first device (101) (101) to cancel or suppress at least a SI at the RFE input of the first device (101) caused by the first signal.

In an embodiment, the interference signal is related to a SI signal caused by the first signal, an echo component from the first signal, a crosstalk interference signal from the first device (101) and the second device (103), and a crosstalk self-interference signal from one of the first device (101) and the second device (103).

In an embodiment, the ratioed impedances controller comprises a MLD circuit that generates a MLD output impedance based on the input impedance associated with the second signal transmitted from the second device (103). The ratioed impedances controller further comprises RD circuit connected to the MLD circuit. The RD circuit generates a RD output impedance based on the MLD output impedance. Further, the ratioed impedances controller comprises a RFE circuit connected to the RD circuit. The RFE circuit generates a RFE input impedance based on the MLD output impedance and the RD output impedance.

In an embodiment, the MLD circuit comprises a plurality of transconductance cells or driver cells each of which is driven by a signal to be transmitted and replicas of echo components of the first signal, wherein the transconductance cells or driver cells are tunable.

In an embodiment, the MLD circuit is configured to transmit a PAM signal with two bits represented by a MSB and LSB representing replicas of echo components of the first signal for pre-equalization of the second signal.

In an embodiment, the RD circuit provides a lower current or a lower power than the main line driver circuit to generate the RD output impedance to cancel or suppress the interference.

In an embodiment, the first device (101) adjusts the MLD output impedance to match the input impedance of a MLD circuit of the second device (103).

In an embodiment, the method for cancelling or suppressing the interference signal from the second signal based on the plurality of ratioed impedances comprises scaling. The first device (101) scales the second signal based on the MLD output impedance and the RD output impedance to obtain a scaled second signal. The method further comprises cancelling or suppressing, by the first device (101), the interference signal from the scaled second signal based on the RFE circuit input impedance and a plurality of interference mitigation parameters.

In an embodiment, the plurality of interference mitigation parameters comprises at least one of echo components of the first signal, NEXT components of the second signal from the at least one second transmission lane adjacent to the first transmission lane in the multi-lane interconnects, FEXT components of the second signal from the at least one second transmission lane adjacent to the first transmission lane in the multi-lane interconnects, and a replicas of the echo components of the first signal from the at least one first transmission lane adjacent to the second transmission lane in the multi-lane interconnects.

In an embodiment, the echo component is analyzed and separated from the first signal by the first device (101) to identify various characteristics comprising at least one of delay and amplitude of the echo component in the first signal.

In an embodiment, the NEXT components comprise at least one of amplitude, frequency, and phase of signals at the first device (101) from the first transmission lane that interfere with signals from the at least one second transmission lane adjacent to the first transmission lane.

In an embodiment, the NEXT components comprise at least one of amplitude, frequency, and phase of signals at the second device (103) from the first transmission lane that interfere with signals from the at least one second transmission lane adjacent to the first transmission lane.

In an embodiment, the replicas of the echo components comprise reflections or echoes of the first signal that are present in the at least one first transmission lane adjacent to the second transmission lane. The replicas of the echo components occur due to a physical proximity of lanes in the multi-lane interconnects and cause the interference with the second signal being received in the first transmission lane while transmitting the first signal in the first transmission lane.

In an embodiment, the first device (101) performs an equalization to overcome distortion of the second signal for higher frequency components of the second signal caused by a larger time constant at the RFE circuit.

In an embodiment, the method for cancelling or suppressing the interference signal from the scaled second signal based on the RFE input impedance and the plurality of interference mitigation parameters comprises correlating operation. The first signal is correlated with delayed replicas of the first signal. The signals transmitted from the at least one second transmission lane adjacent to the first transmission lane are correlated with the second signal based on the RFE input impedance and the plurality of interference mitigation parameters. The method further comprises cancelling or suppressing, by the first device (101), the interference signal from the scaled second signal based on the correlating.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may, depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

What is claimed is:

1. A method for mitigating an interference signal in a multi-lane interconnect comprising:

transmitting, by a first device, a first signal using a Main Line Driver (MLD) to a second device on a first transmission line of the multi-lane interconnect between the first device and the second device, wherein the multi-lane interconnect is associated with one of a single-ended transmission line circuit and differential-ended transmission line circuit between the first device and the second device;

receiving, by the first device, a second signal transmitted from the second device on the first transmission line while simultaneously transmitting the first signal to the second device on the first transmission line, wherein a signal at a Receiver Frontend (RFE) input of the first device comes through a ratioed impedance circuit of the first device and comprises the second signal and the interference signal;

adjusting, by the first device, a plurality of impedances such that an input impedance ($Z_{in}$) seen into the first device from the first transmission line matches a characteristic impedance ($Z_0$) of the first transmission line; and tuning, by the first device, a Ratioed Driver (RD) of the first device to cancel or suppress at least a Self-Interference (SI) at the RFE input of the first device caused by the first signal.

2. The method as claimed in claim 1, wherein echoes of the first signal are also suppressed by the RD by generating delayed replicas of the first signal, and scaling and adding the delayed replicas to the RFE input of the first device.

3. The method as claimed in claim 1, wherein a Near End Cross Talk (NEXT) caused by at least one or more signals transmitted in adjacent lanes are also suppressed by the RD by generating at least one of an original, and delayed replicas of the one or more signals transmitted in the adjacent lane, and scaling and adding the generated signals to the RFE input of the first device.

4. The method as claimed in claim 1, wherein the MLD comprises a plurality of transconductance cells or driver cells each of which is driven by a signal to be transmitted or a signal's delayed replica, wherein the transconductance cells or driver cells are tunable.

5. The method as claimed in claim 1, wherein the MLD is configured to transmit a Pulse Amplitude Modulation (PAM) signal with two bits represented by a Most Significant Bit (MSB) and Least Significant Bit (LSB).

6. The method as claimed in claim 1, wherein the RD provides a lower current or a lower power than the MLD to generate the RD output to cancel or suppress the SI.

7. The method as claimed in claim 1, wherein the first device performs transmit side pre-emphasis equalization by generating a signal to be transmitted and its delayed replicas using multiple transconductance cells or driver cells in the MLD.

8. The method as claimed in claim 1, wherein cancelling or suppressing, by the first device, the interference signal at the RFE input of the first device comprises:

correlating, by the first device, the RFE output with the at least one of an original and delayed replicas of the first signal to adjust one or more weight coefficients to tune strengths of one or more of transconductance cells or driver cells in the RD adaptively.

9. The method as claimed in claim 1, wherein cancelling or suppressing, by the first device, the interference signal at the RFE input of the first device also comprises:

correlating, by the first device, the RFE output with at least one of original and delayed replicas of a signal transmitted by the first device in adjacent lanes to adjust weight coefficients to tune strengths of one or more of transconductance cells or driver cells in the RD adaptively to cancel or suppress Near End Cross Talk (NEXT).

10. A system for mitigating an interference signal in a multi-lane interconnect, comprises:

a first device comprising a plurality of transceivers, and a ratioed impedance controller;

a second device comprising a plurality of transceivers, and a ratioed impedance controller;

a multi-lane interconnect circuit connecting the first device with the second device using a multi-lane interconnect, wherein the multi-lane interconnect circuit is one of a single-ended transmission line circuit and differential-ended transmission line circuit between the first device and the second device, wherein the multi-lane interconnect circuit is configured to transmit a first signal to the second device on a first transmission line of the multi-lane interconnect;

wherein a ratioed impedance controller of the first device is configured to:

transmit the first signal using a Main Line Driver (MLD) to the second device on the first transmission line of the multi-lane interconnect between the first device and the second device;

receive a second signal transmitted from the second device on the first transmission line while simultaneously transmitting the first signal to the second device on the first transmission line, wherein a signal at a Receiver Frontend (RFE) input of the first device comes through a ratioed impedance circuit of the first device and comprises the second signal and the interference signal;

adjust a plurality of impedances such that an input impedance ($Z_{in}$) seen into the first device from the first transmission line matches a characteristic impedance ($Z_0$) of the first transmission line; and tune a Ratioed Driver (RD) of the first device to cancel or suppress at least a Self-Interference (SI) at the RFE input of the first device caused by the first signal.

11. The system as claimed in claim 10, wherein echoes of the first signal are also suppressed by the RD by generating delayed replicas of the first signal, and scaling and adding the delayed replicas to the RFE input of the first device.

12. The system as claimed in claim 10, wherein a Near End Cross Talk (NEXT) caused by at least one or more signals transmitted in adjacent lanes are also suppressed by the RD by generating at least one of an original, and delayed replicas of the one or more signals transmitted in the adjacent lanes, and scaling and adding the generated signals to the RFE input of the first device.

13. The system as claimed in claim 10, wherein the MLD comprises a plurality of transconductance cells or driver cells each of which is driven by a signal to be transmitted or a signal's delayed replica, wherein the transconductance cells or driver cells are tunable.

14. The system as claimed in claim 10, wherein the MLD is configured to transmit a Pulse Amplitude Modulation (PAM) signal with two bits represented by a Most Significant Bit (MSB) and Least Significant Bit (LSB).

15. The system as claimed in claim 10, wherein the RD provides a lower current or a lower power than the MLD to generate the RD output to cancel or suppress the SI.

16. The system as claimed in claim 10, wherein the first device performs transmit side pre-emphasis equalization by generating a signal to be transmitted and its delayed replicas using multiple transconductance cells or driver cells in the MLD.

17. The system as claimed in claim 10, wherein cancelling or suppressing the interference signal at the RFE input of the first device comprises:

correlating the RFE output with the at least one of a original and delayed replicas of the first signal to adjust one or more weight coefficients to tune strengths of one or more of transconductance cells or driver cells in the RD adaptively.

18. The system as claimed in claim 10, wherein cancelling or suppressing the interference signal at the RFE input of the first device also comprises:

correlating the RFE output with at least one of an original and delayed replicas of a signal transmitted by the first device in adjacent lanes to adjust weight coefficients to tune strengths of one or more of transconductance cells or driver cells in the RD adaptively to cancel or suppress Near End Cross Talk (NEXT).

* * * * *